United States Patent [19]

Savoie et al.

[11] Patent Number: 4,949,947
[45] Date of Patent: Aug. 21, 1990

[54] EYEGLASS SUPPORT

[76] Inventors: Marc Y. Savoie, 166 Maple Street, Moncton, New Brunswick, Canada, E1C-6A4; Charles R. Smith, 10 Madison Avenue, Moncton, New Brunswick, Canada, E1E 1R6

[21] Appl. No.: 114,937

[22] Filed: Oct. 30, 1987

[51] Int. Cl.⁵ .............................................. B25B 1/24
[52] U.S. Cl. .................................... 269/266; 269/287; 269/203; 269/254 CS
[58] Field of Search ................. 269/266, 287, 253, 45, 269/254 CS, 203

[56] References Cited

U.S. PATENT DOCUMENTS

| 626,427 | 6/1899 | Jones | 269/266 |
|---|---|---|---|
| 1,499,989 | 7/1924 | Lehman | 269/266 |
| 2,486,494 | 11/1949 | Rice | 269/266 |
| 2,498,725 | 2/1950 | Thornburg | 269/234 |
| 3,868,102 | 2/1975 | Pevar | 269/266 |
| 4,049,254 | 9/1977 | Godot | 269/156 |

Primary Examiner—Judy Hartman

[57] ABSTRACT

An eyeglass frame holder is provided in the form of a variable contour vice. The vice incorporates a series of parallel slideable jaw elements in two banks that may be locked in position by a single wedge clamp which forces a pair of thrust elements outward to frictionally lock the two banks of jaw elements.

5 Claims, 5 Drawing Sheets

EYEGLASS SUPPORT

FIELD OF THE INVENTION

This invention relates to lens-making techniques for eye glasses. More particularly, this invention relates to an improved device for gripping eyeglass frames for the purpose of measuring the geometry of the lens openings in such frames.

BACKGROUND TO THE INVENTION

In the art of cutting eyeglass lenses it is necessary to know precisely the geometry of the lens opening within which such lenses are to be fitted. In order to measure the geometry of this lens opening the eyeglass frames must be precisely held in position, without any distortion in shape, throughout the measuring procedure. A number of prior patents have addressed this problem, vis U.S. Pat. No's. 4,049,254; 3,666,259; 3,622,144; 3,617,046 and 3,145,417 where various jigs and clamps for this purpose are discussed. These prior techniques are generally characterized by the application of clamps or restraining bars to a limited number of points e.g. 3-4, surrounding an individual lens opening. U.S. Pat. No. 3,617,046 to Sotonyl is typical in this regard.

When an eyeglass lens frame is being restrained at only a limited number of restraining points, reliance is being placed on the structural rigidity of the lens frame to ensure that the frame retains its natural shape. However, where eyeglass frames are constructed of thin rims, as in wire-rim glasses, the frame itself has significantly less structural rigidity. Where the frame is fragile, the force applied by a clamping support or jig may tend to distort its shape. Further, it is customary to extract the geometry by means of a probe which applies a slight but significant force to the edge of the rim. Even slight distortions of shape can lead to an incorrect fit for lenses intended to be mounted in the lens opening.

It is therefore especially desirable to produce an eyeglass frame mount which will grasp eyeglass frames in such a way as to ensure that they are securely retained, with a minimum of distortion in the shape of the lens openings.

Eyeglass frames are inherently irregular and variable in their shape. It is known in the prior art to build a vise or gripping device with a composite or sectional jaw assembly that can grasp and retain an irregularly shaped object. The jaws in such variable contour vices have generally been formed from a series of slideably advanceable jaw elements constituted by parallel pins or plates. Patents covering vices in this category include United States patent in a number of categories, as follows:

(a) 2,736,936; 4,239,199
(b) 4,284,267; 3,868,102; 2,399,824;
(c) 2,518,867; and
(d) 626,427; 1,499,989; 2,486,494; 2,658,418; 2,754,708;

In all of these references an irregularly shaped object is retained by moving a number of parallel, separately slideable pins, bars or plates, up into contact with the outside surface of the object. In this position the retaining ends of each of these sliding elements collectively produce a contour which confirms substantially to the outside shape of the object to be grasped.

Once the object to be grasphed is fully embraced by the sliding elements, it is necessary that these elements be locked, or at least partially stabilized, in position. This is accomplished variously by the use of resilient means, such as mechanical springs (a above) that thrust the individual elements forward; by pneumatic or hydraulic cylinders (b above); by the friction of a threaded support (c above), and by positive clamping systems (d above).

Where resilient constraining means are used to hold the sliding elements in position, there is always the risk that the object being grasped will not be firmly held. Where the resilient forces are increased in order to reduce this tendancy, as by the use of stiffer springs, there is a risk that the sliding elements may distort the shape of objects that are fragile or delicate. By way of contrast, a positive clamping system ensures immobilization of the sliding elements without necessarily applying excessive compressive forces to the object being grasped.

The patents referenced earlier that contain positive clamping elements (category (d)) all rely on a "lateral" or transverse clamping system. This system relies on applying a compressive force to the sliding elements, clamping them together transversely, across the array of elements, so as to collectively immobilize them. An advantage of this system is that all of the sliding elements experience the same clamping force. This transverse method of clamping provides a positive state of immobilization for the sliding elements, to a degree not present in resilient stabilization mechanisims. But it also has the characteristic of slightly compressing the sliding members after the clamping force is applied.

The result of applying a compressive force to an array of sliding elements is to tend to displace the sliding elements together. If the elements have previously been precisely positioned to grasp a fragile object, the use of this type of immobilization system will displace the ends of the sliding elements towards each other and distort, however so slightly, the shape of the object being grasped.

In the case of eyeglass frames, it is necessary to similtaneously grasp and retain both lens openings. If a single transverse clamping system were to be used in conjunction with a series of slidable jaw elements, the effect of the clamping force would displace both lens openigns towards each other. This would produce a distortion in the shape of the frame defining the lens openings.

A means is therefore required for providing a clamping mechanism for immobilizing the sliding elements in the jaws of a variable contour vice adapted to constrain eyeglass frames where the clamping of the sliding elements has a minimum tendancy to displace such elements from their ideal locations.

SUMMARY OF THE INVENTION

According to the invention a variable contour vice incorporating two series of parallel sliding jaw elements is adapted to contain and restrain the respective lens opening portion of an eyeglass frame by means of a centrally applied clamping force that immobilizes the sliding jaw elements in two separate banks.

More particularly a mount is provided within which a series of slideable jaw elements may be advanced against the rims of a pair of eyeglasses to immobilize the eyeglass frames with a minimum degree of distortion.

By one aspect of the invention the slideable jaw elements are variably spaced so as to be more densibly packed in the respective regions towards the outer edges of the frames for each lens opening in the eyeglasses.

By a further feature of the invention a single clamping mechanism is provided that applies a clamping force simultaneously to both banks of jaw elements.

These and further features of the invention will be understood from the description of the preferred embodiment which follows.

SUMMARY OF THE DRAWINGS

In FIG. 1 the overall assembly of the contour vice is depicted. A base 1, has shafts 2 fitted into it. Sliding on the shafts is a back bar 3 against which the top of the eyeglass frames is intended to rest. This back bar 3 can be adjusted to close the mounting space where narrow or half-frame eyeglass are being installed.

Figure 2:
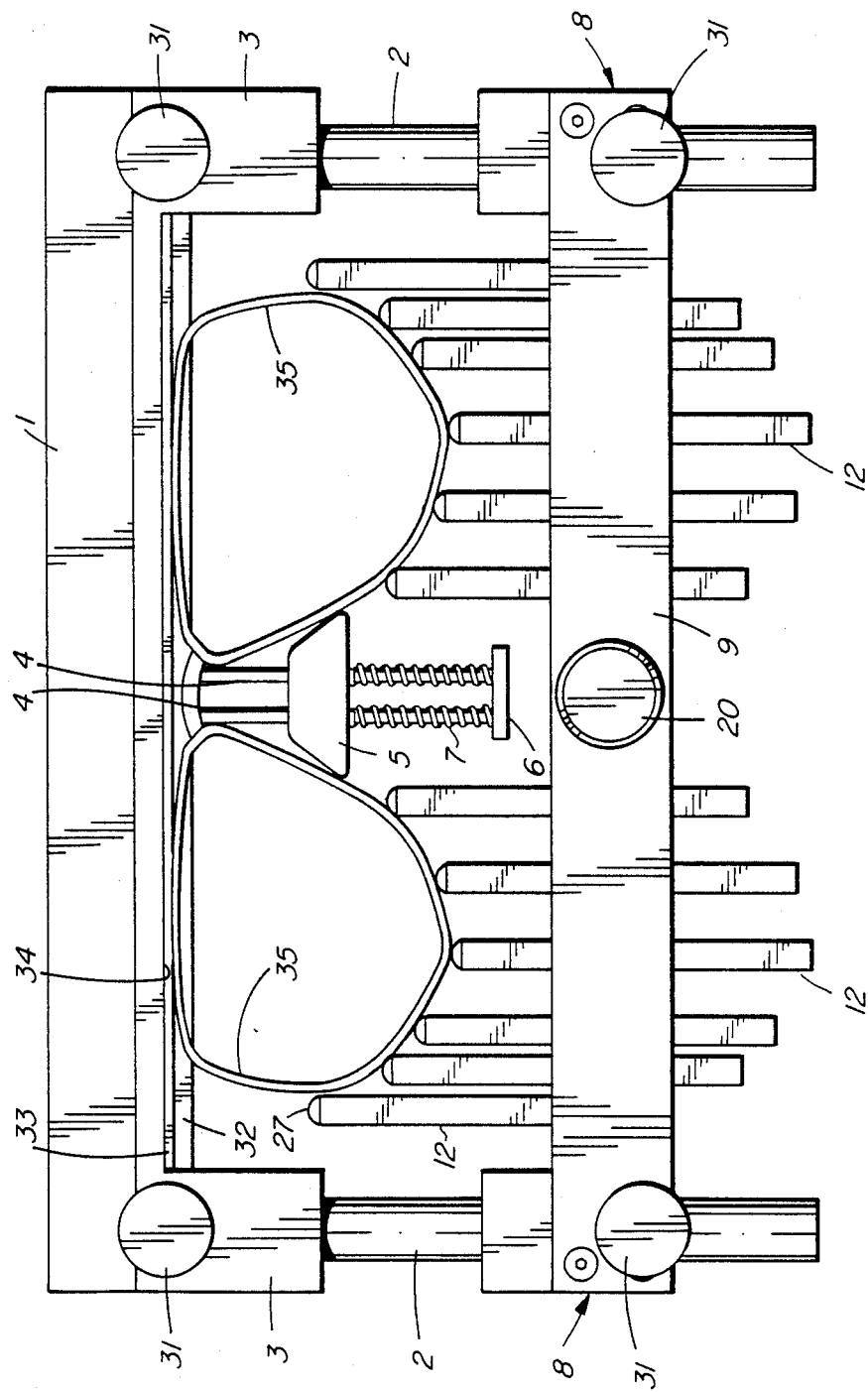
FIG. 2 is a plan view of the vice with a pair of eyeglass frames installed therein.

Centrally located and mounted to the back bar 3, as best seen in FIG. 2, are two support shafts 4 for the nasal wedge 5. Two support shafts 4 are used to ensure that the nasal wedge 5 maintains its orientation. A single shaft with a key way could be used as an alternative. The support shafts 4 are fixed in the back bar 3 and the nasal wedge 5 slides thereon. An end-stop 6 limits its travel. Springs 7 tend to thrust the nasal wedge 5 towards the back bar 3. When eyeglass frames are mounted in the vice, the nasal wedge 5 fits against the nose-pieces on the eyeglass frame and presses the frame initially into a central position against the back bar 3. A ledge 32 is shown formed in the backing bar 3 in FIG. 2. This ledge serves as a support for the top edge of the eyeglass frame. A hard rubber strip 33 is glued along the thrust receiving wall 34 of the back bar 3 to protect the eyeglass frame from being scratched.

Slideably mounted towards the other ends of the adjustment shafts 3 is the slider support rail assembly 8. This assembly 8 has an outer frame comprised of an upper rail 9 a lower rail 10, and two spacer blocks 11, all best seen in FIG. 3. The spacer blocks 11 are slideable on the adjustment shafts 2. "Collectively, the upper rail 9, lower rail 10, and two spacer blocks 11 serve as a jaw carrier for the slider bars 12, and jaw elements".

Figure 4:
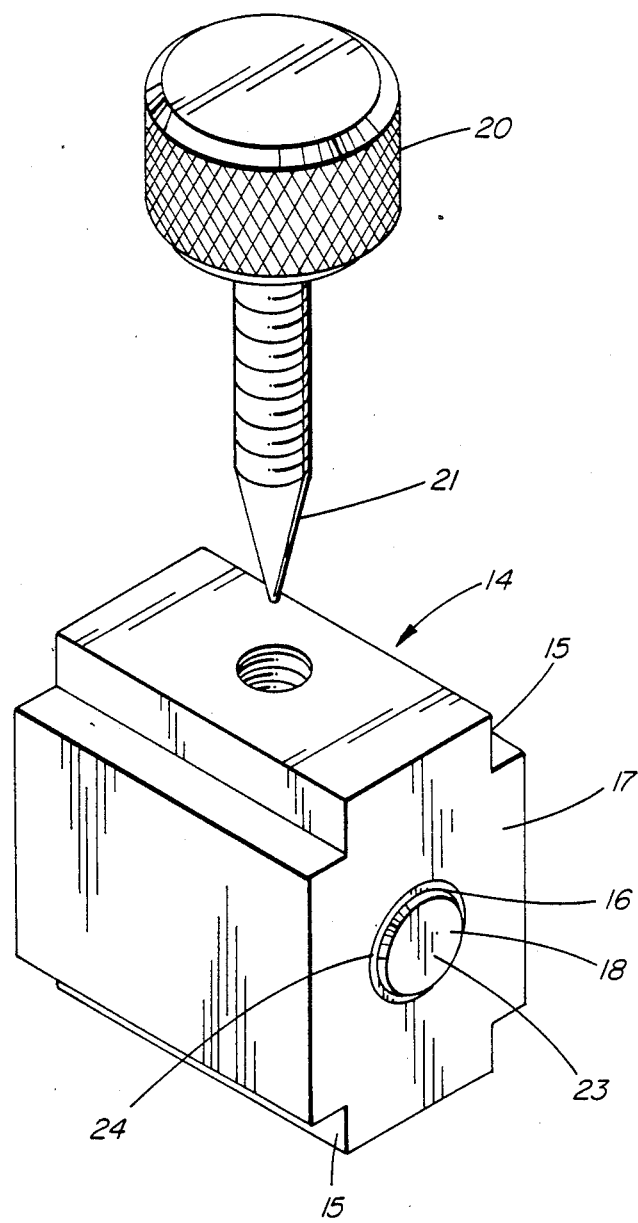
FIG. 4 is an isometric assembly drawing of elements of the central clamping mechanism.

The upper and lower rails 9, 10 are "U" shaped in cross-section thus providing two "U" shaped channels 35. The space between them is occupied by the slider bar support and clamping assemblies. These consist of the slider bars 12, or jaw elements, nylon spacers 13 between the respective slider bars 12, and the center locking mechanism 14. These slider bars 12 and spacers 13 are divided into two sections or banks by the center locking mechanism 14. The center locking mechanism 14, as seen in FIG. 4, consists of a rigid main block 17, having the cross-sectional shape of a cross. This shape provides for upper and low protruding portions 15 to fit snuggly in the "U" shaped channels 35 defined by the rails 9, 10. The spacers 13 have a shape in cross-section like the main block 17 so that the spacer blocks 13 as well are contained within the channels 35.

Figure 5:
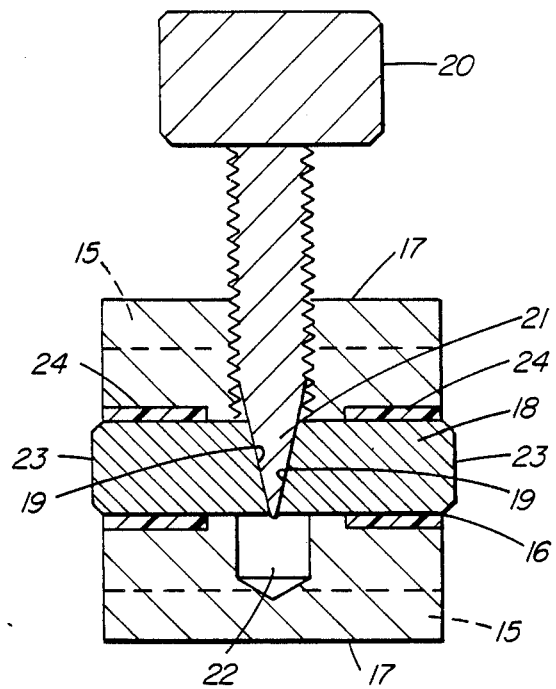
FIG. 5 is a cross-sectional view of the clamping mechanism.

Within the center locking mechanism 14 are two holes, best seen in FIG. 5. A first horizontal hole 16 passes completely through the main block 17. This hole 16, is optionally counter sunk for a portion of its depth at both ends to receive nylon bushings 24. Passing through the hole 16 are two thrust shafts 18, each with their inner ends formed with a bevelled surface 19.

Threadably mounted within the main block 17 is a clamping screw 20 which has a cone-shaped end 21. This end 21 is capable of advancing into a clearance pocket 22 formed in the main block 17.

By advancing the clamping screw 20, the cone shaped end 21 bears against the bevelled surfaces 19 of the thrust shafts 18. This displaces the thrust shafts 18 outwardly. The outer ends 23 of the thrust shafts 18 bear against the respective first or inner sliders 12 of the right and left banks of sliders 12, clamping them and the spacer blocks 13, in position. It is not essential that the end 21 of the clamping screw 20 be conic, and that the ends 19 of the thrust shafts 18 be bevelled surfaces. The function of the clamping screw 20 is to apply a wedging action between the thrust shafts 18. This could be accomplished by carrying a swivelly mounted wedge on the clamping screw 19, and providing the thrust shafts 18 with inner ends of any of a variety of shapes that would receive the wedging force developed when the clamping screw is advanced.

The thrust shafts bear at their outer ends against the first of the slider plates 12. These plates 12 are then squeezed between the ends 23 of the shafts 18 and the end blocks 11 which serve as abutment means. The nylon spacer blocks 13 are preferably relatively hard and incompressible. To the extent that they, and the slider bars 12 may be be very slightly compressible, the sliders 12 in each bank would tend to be displaced on compression, if at all, towards the outer end of each bank of sliders 18.

Figure 6:
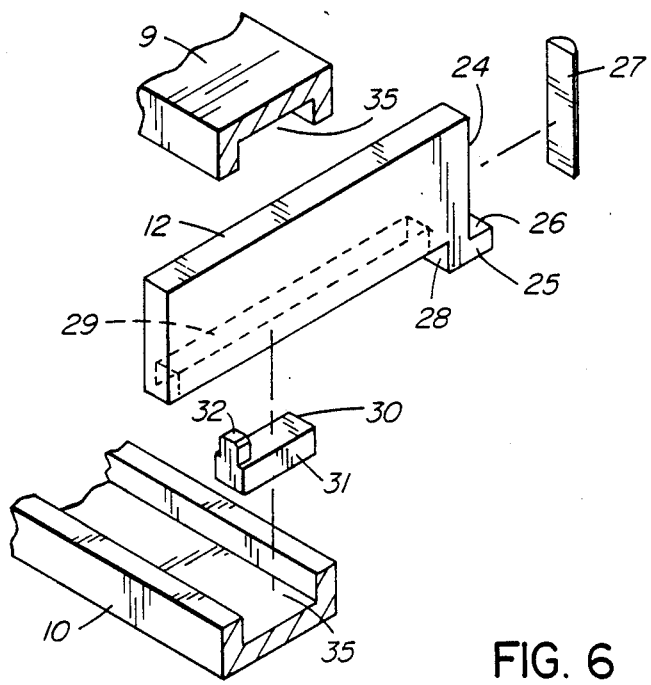
FIG. 6 is an isometric assembly drawing of the slider element.

A typical slider 12 is shown in FIG. 6. This element is dimensioned to fit and slide between the spaces at the outer ends of the "U" channels 35 on the rails 9, 10. The front end 24 of the slider 12 is fitted optionally with a lower tongue 25 which provides a support surface 26 for eyeglass frames to rest on. A hard rubber strip 27 glued to the end 24 of the slider 12 provides a non-marking contact surface for actually bearing on and grasping the rim of the eyeglass frames.

The inner end 28 of the tongue 25 serves as a stop surface to prevent the slider 12 from being fully withdrawn from between the rails 9, 10. At the other end of the slider 12, a groove 29 is milled into its lower edge. A stop pin 30 that has a lower foot 31 fits within the channel 35 of the lower rail 10. A protruding post 32 then sticks up into the groove 29 providing a stop system for preventing the slider from being excessively advanced.

Figure 1:
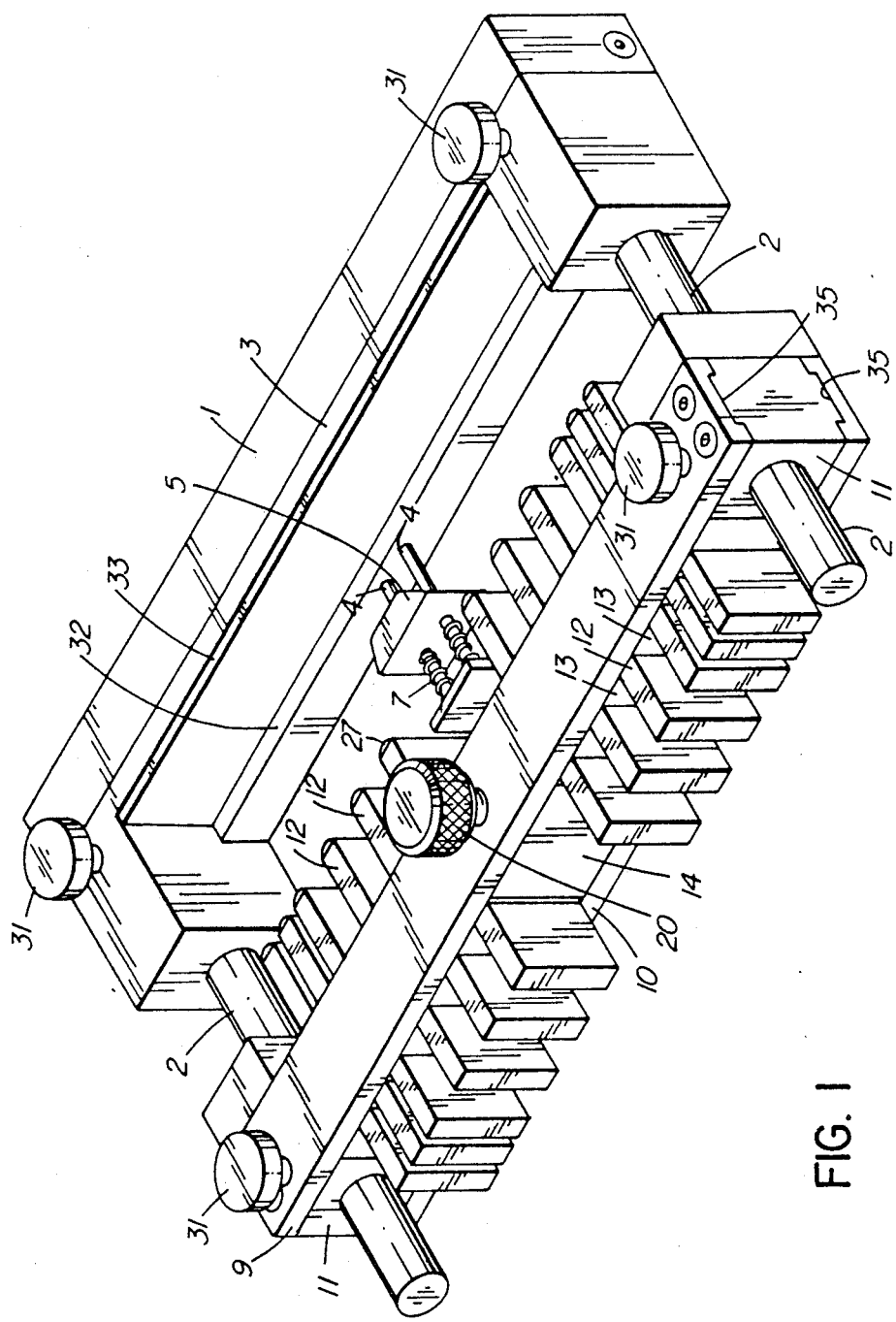
FIG. 1 is an isometric view of the variable contour vice.
Figure 3:
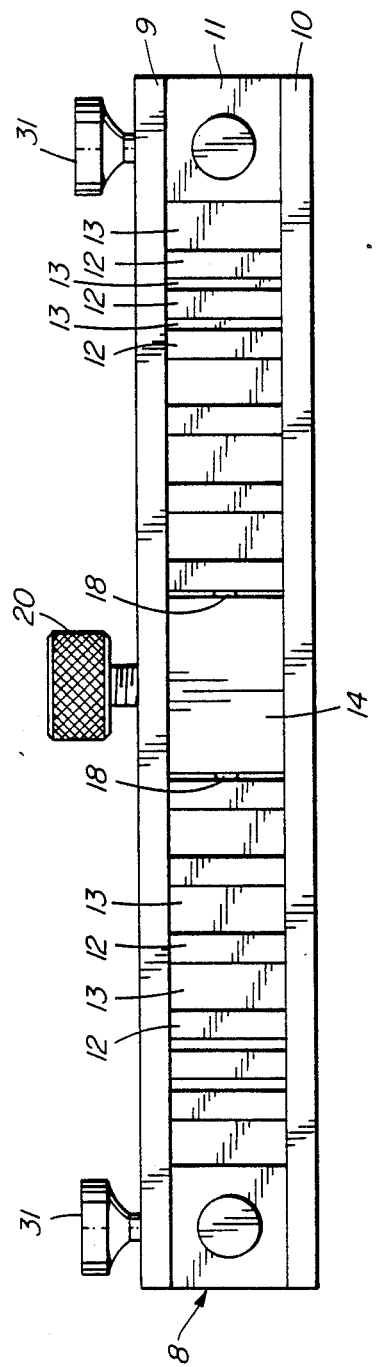
FIG. 3 in an end view of the vice as viewed from the side where the sliding elements are supported and clamped.

The widths of the nylon spacers 13 are conveniently varied, as shown in FIGS. 1 and 3, so as to pack the sliders 12 more densely towards the outside ends of each bank. This spacing allows the sliders to grasp the outer sides of the eyeglass frames at more closely located spacings, along their outer regions where the rims recede from the sliders 12. This feature is particularly important where the outside rim recedes rapidly, and is nearly perpendicular to the direction of advance of the sliders 12. Of course, along fully perpendicular edges, the sliders 12 will fail to provide a supporting contact.

The overall vice assembly is provided with setscrews 31 to lock the adjustable portions in position on the adjustment shafts 2. The sliding elements such as the backing bar 3 and the end blocks 11, may optionally be journalled for ease of movement on linear bearings. Six sliding elements per lens have been found satisfactory. However, more, or less down to 2 per lens or opening may be utilized, according to the sturdiness of the frames to be mounted while the use of spacer elements has been shown they are not essential. It if is desired, the sliding jaw elements may all be installed abutting against each other.

All the parts except those designated as being made of nylon or rubber as envisioned as being made of metal, such as brass or aluminum. However, plastic parts may be used for those elements where it would prove suitable. In operation the sliders 12 are retracted and the nasal wedge 5 is pressed into the springs 7 while the eyeglasses 35 are placed with their top edge against the backing bar 3. The nasal wedge 5 is then released to temporaily restrain the eyeglasses. The sliders 12 are then advanced manually until they all contact and grasp the lower rims of the eyeglass lens openings. The clamping screw 20 is then tightened.

The basis principle of the invention is to divide the composite jaw assembly, constituted by the sliders 12, into two banks which may then be immobilized by a centrally-acting wedge mechanism which applies a transverse clamping force through each bank of sliders. Because of the use of a single clamping control, in the form of the clamping screw 20, the clamping of both banks of sliders 12 may be effected simultaneously using only one hand. This leaves the other hand free to sense that a firm contact is maintained between the sliders and the eyeglass rims while the clamping force is being applied.

The overall benefits of this system include simplicity of construction, its reliability in immobilizing an eyeglass frame without creating significant distortions, and its ease of use.

The foregoing description of a preferred embodiment is exemplary of the invention and its various aspects. The invention and its aspects are further described and more particuarly defined in the claims which follow.

I claim:

1. A variable contour vice adapted to retaining a pair of eyeglasses comprised of:

(a) a frame with an opening within which to receive a a pair of eyeglasses, said frame including a stationary wall and a jaw carrier;
    (b) a backing surface along an inner portion of said stationary wall of said frame against which on upper side of an eyeglass frame which is to be retained may be placed;
    (c) first and second banks of parallel mounted slidable jaw elements mounted on said jaw carrier said frame, such, slideable jaw elements being capable of advancing towards said backing surface;
    (d) first and second abuttment means respectively mounted to said carrier at the outermost ends of said first and second banks of slideable jaw elements; and
    (e) clamping means mounted between said banks of jaw elements at, innermost end of each bank of slideable jaw elements said clamping means including a wedge member and a pair of thrust elements wherein said wedge member, when advanced, is adapted to apply a clamping force through said pair of thrust elements so as to simultaneously compress said first and second banks of jaw elements against their respective abuttment means and thereby immobilize said and,
    (f) resilient means mounted on said stationary wall for centrally locating a portion of said eyeglasses against said stationary wall.

2. A vice as in claim 1 wherein said wedge member comrpises a threaded shaft with a conic end and said thrust elements comprise transversely mounted shafts having bevelled ends against which said conic end may bear.

3. A vice as in claim 1 wherein said jaw elements are more densely spaced towards said outermost ends of each bank of the series of jaw elements.

4. A vice as in claim 1 wherein said backing surface is provided with a support ledge for supporting said upper end of an eyeglass frame, and said jaw elements are provided with protruding tongues along a portion of the elements facing towares said backing surface each of said tongues being capable of supporting a bottom end of an eyeglass frame when its associated jaw element is in contact with said frame.

5. A vice as in claim 1 wherein relatively compressible spacer elements are located transversely between said slideable jaw elements.

* * * * *